E. J. SOLOMON.
TRACTION DEVICE FOR VEHICLE WHEELS.
APPLICATION FILED JULY 13, 1911.
1,132,805.
Patented Mar. 23, 1915.
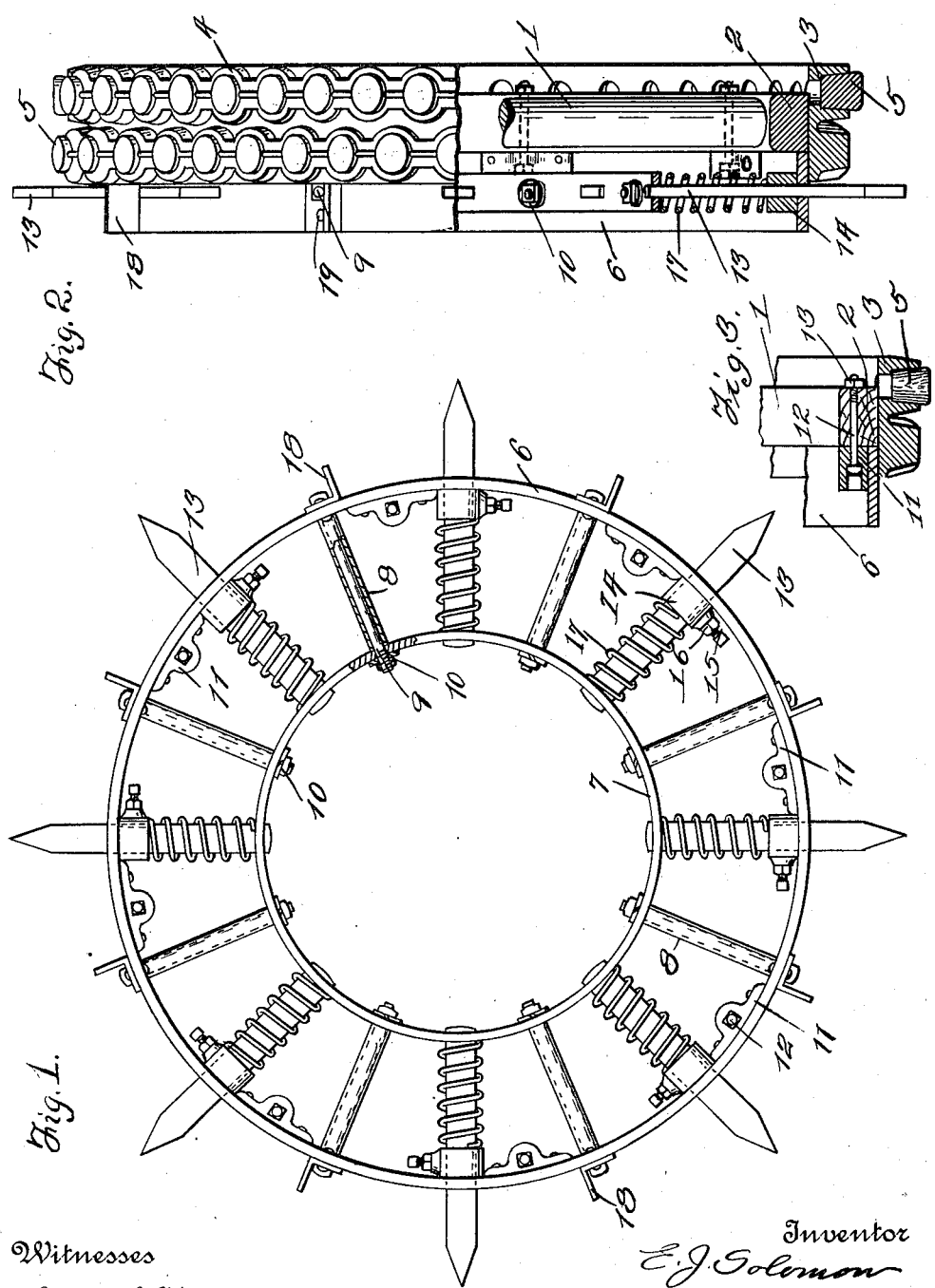
Witnesses
Stuart Hilder.
S. M. Cook
Inventor
E. J. Solomon
By H. H. Bliss
Attorney

UNITED STATES PATENT OFFICE.

EDGAR J. SOLOMON, OF PEORIA, ILLINOIS, ASSIGNOR TO AVERY COMPANY, A CORPORATION OF ILLINOIS.

TRACTION DEVICE FOR VEHICLE-WHEELS.

1,132,805.  Specification of Letters Patent.  Patented Mar. 23, 1915.

Application filed July 13, 1911. Serial No. 638,327.

*To all whom it may concern:*

Be it known that I, EDGAR J. SOLOMON, a citizen of the United States, residing at Peoria, in the county of Peoria and State of Illinois, have invented certain new and useful Improvements in Traction Devices for Vehicle-Wheels, of which the following is a specification, reference being had therein to the accompanying drawing.

This invention relates to improvements in traction attachments for wheels and in particular to removable devices provided with spring extended spiked rods, such as may be easily attached to a wheel.

In the drawings: Figure 1 is a side elevation of the attachment with portions of one of the radial braces broken away. Fig. 2 is a partial transverse sectional view. Fig. 3 is a partial sectional view through one of the fastening lugs.

Referring to the drawings, the numeral 1 represents the spokes of a traction wheel on the outer ends of which is mounted a felly 2. A rim 3 encircles the felly 2 and in the type of wheels shown is provided with a plurality of hollow lugs 4 in which are inserted plugs 5, made of some suitable material. Two concentric rings 6 and 7 are rigidly secured to each other and spaced apart by means of radial tubular braces 8, through the centers of which extend rods 9, threaded at each end and secured by the nuts 10. The outer ring 6 is of such diameter that it will fit closely within the rim 3 and abut against the felly 2, a plurality of lugs 11 being riveted to the inner side of the ring and provided with holes through which bolts 12 are passed to secure the ring to the felly. The outer portions of the holes in the lugs 11 are countersunk and squared to receive the square heads of the bolts 12 and prevent their turning.

Slots are cut in radial alinement through both of the rings to retain the spiked rods 13 which are free to move within the slots. Collars 14 are placed upon the spiked rods intermediate the two rings and are provided with set screws 15 and lock nuts 16 so that they may be set at any desired place upon the rods. Coil springs 17 are placed upon the spiked rods between the collars 14 and the inner ring, normally bearing against the collars 14, thereby extending the spiked rods through the outer ring 6. When, however, the spiked rods come in contact with a hard surface, such as rocks or stumps, instead of subjecting the entire device to undue shock, the springs will be compressed thus allowing the rods to be retracted as far as necessary to overcome the obstruction. This does not lessen, however, the tractive effect as the springs are of sufficient strength to extend the rods into soft material and prevent slipping of the wheels.

Transverse paddle-like extensions 18 are placed around the periphery of the outer ring 6 and extend to a height slightly less than the periphery of the tire. The radial brace rods 9 extend through one leg of the extensions and serve to secure them upon the ring, the extensions being further secured by means of the rivets 19. The extremities of the extensions are at all times within the periphery of the wheel so that normally, when the wheel is being driven over hard roads, they will not contact with the ground; when however, the wheel is run upon soft or yielding ground and the tire sinks below the surface, the extensions 18 will come in contact with the ground and materially aid the spiked rods in gripping the surface.

What I claim is:

The combination with a wheel, of two concentric rings adapted to be removably mounted on the side of the wheel, spiked rods extending through radially alined openings in the two rings and slidable therein, collars mounted on the rods between the two rings, springs surrounding the rods between the collars and inner ring, paddle-like extensions on the outer periphery of the outer ring, the projection of which is within the tread of the wheel, elongated bolts extending through the outer and the inner rings and securing the paddle-like extensions to the outer ring, and spacer tubes surrounding the elongated bolts and positioned between the outer and inner rings.

In testimony whereof I affix my signature, in presence of two witnesses.

EDGAR J. SOLOMON.

Witnesses:
J. M. CALDWELL,
L. M. STACY.